Nov. 8, 1932.     H. HUEBER     1,886,956
WINDSHIELD CLEANER
Filed Aug. 3, 1929
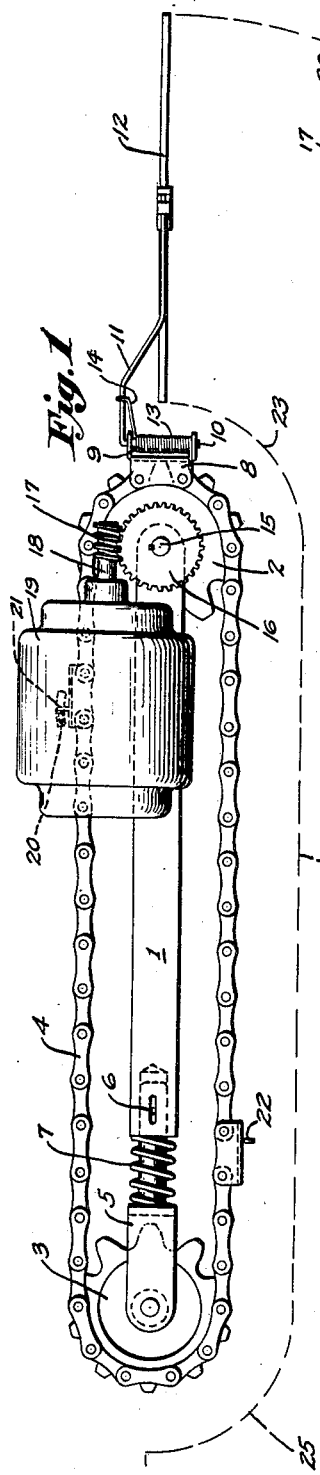
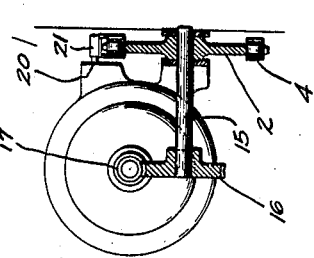
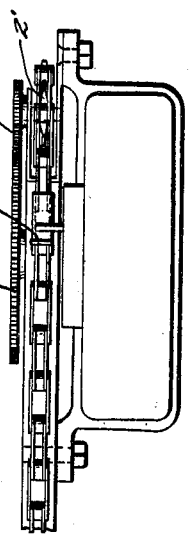
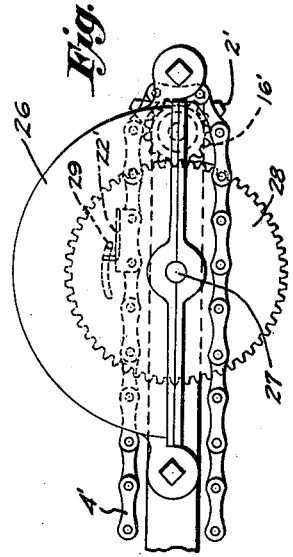
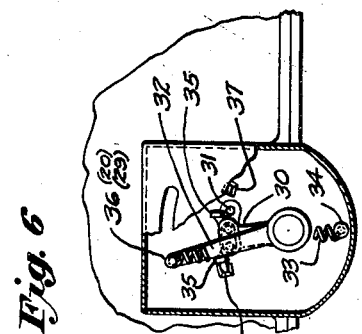
Inventor
Henry Hueber
by Burton A. Beau Jr.
Attorney Patented Nov. 8, 1932

1,886,956

UNITED STATES PATENT OFFICE

HENRY HUEBER, OF BUFFALO, NEW YORK, ASSIGNOR TO TRICO PRODUCTS CORPORATION, OF BUFFALO, NEW YORK

WINDSHIELD CLEANER

Application filed August 3, 1929. Serial No. 383,192.

This invention relates to a windshield cleaner and has particular reference to the wiper action or movement for increasing the effective sweep of the cleaner.

In the more frequently used type of windshield cleaner the wiper blade is given an oscillatory movement in an arcuate path so that the cleaned field of vision is restricted to a small segmental-shaped area, leaving the portion of the windshield at either side of such segmental-shaped area uncleaned so that traffic conditions to either side of the main line of travel of the vehicle may not always be observed. In the straight reciprocatory type of windshield cleaner, that is where the wiper blade moves in a straight path across the windshield, it has been necessary to reduce the frequency of the wiper reciprocations due to the increased length of the wiper movement, and this reduction of speed has necessitated the use of a more or less intricate power unit for imparting reciprocatory motion to the wiper.

The present invention has for its object to provide a novel wiper movement combining the arcuate wiper movement with the straight reciprocatory wiper movement whereby an increased zone or area is effectively cleaned; to provide a simple drive for the wiper in which the straight reciprocatory portion of the wiper movement terminates in an accelerated arcuate movement; and in the features of construction and the arrangements and combinations of parts hereinafter more fully described and claimed, reference being had to the accompanying drawing wherein, Fig. 1 is an elevation depicting clearly the mechanism for effecting the desired wiper movement, the power being derived from an electric motor.

Fig. 2 is a transverse section through the drive sprocket-end of the mechanism.

Fig. 3 is a detailed section through the sprocket frame.

Fig. 4 is a fragmentary elevation depicting a fluid pressure motor type of drive.

Fig. 5 is a top plan view of the part of the mechanism disclosed in Fig. 4.

Fig. 6 is a fragmentary showing of a simple power-switching mechanism for reversing the motor drive.

The preferred embodiment of my invention comprises a supporting frame 1 having a drive wheel or sprocket 2 journalled at one end and a guide wheel or sprocket 3 journalled in its opposite end for supporting the endless flexible member or sprocket chain 4, the chain being maintained operatively taut by a slack take-up construction in the frame 1. This frame construction has a fork or yoke 5 in which the guide sprocket 3 is journalled and which is extensibly connected to the main body portion of the sprocket frame, as by a pin and slot connection 6. The extensible part 5 of the sprocket frame is urged into extended relation with the body of the frame by a spring 7 thereby maintaining the sprocket chain 4 free from objectionable slack.

One link or section of the chain is provided in the form of a carrier 8 having a bearing sleeve 9 extending lengthwise of the pin and in which is journalled the angular end 10 of a wiper carrying arm 11 which supports on its free end the wiper blade 12. A spring 13, having one end suitably anchored, is mounted about the sleeve 9 and has its free end 14 extended downwardly alongside of the wiper arm and engaged thereover to urge the wiper blade into the desired wiping contact with the windshield glass.

The shaft 15, on which the drive sprocket 2 is fixed, also supports a worm gear 16 which has meshing relation with a worm 17 carried by the shaft 18 of the electric motor 19.

In the operation of the cleaner, the electric motor is set in operation by closing a switch indicated at 20, the electric motor being of the reversing type and the switch being movable from one to the other of its two operative positions by a snap action, hereinafter described, which is thrown alternately by spaced trips 21 and 22 carried on the sprocket chain 4. The operation of these actuating parts is such that as the wiper approaches its limit of movement in one direction one trip 21 will move the switch to its other operative position whereupon the motor will reverse itself and move the wiper in its opposite direction until it just about reaches its opposite limit of movement when the companion trip 22 will actuate the switch 20 to its first operative position thereby again reversing the motor and the direction of the wiper movement.

Thus, in Fig. 1 the wiper 12 has just reached its upward limit of swing and the trip 21 has just moved the switch 20 to its left hand operative position. The motor 19 will now reverse itself and cause the wiper blade 12 to swing downwardly around the arc indicated by the curved dash line 23, and after the carrier 8 leaves the drive sprocket and proceeds toward the guide sprocket 3 the wiper will follow a straight course as indicated by the straight dash line 24. As the carriage 8 moves onto and about the sprocket 3 the wiper will be caused to travel an upward arcuate path substantially as indicated by the dashed arc 25. At the upward limit of movement of the wiper the companion trip 22 will engage the switch 20 and swing it to the right thereby reversing the motor and causing the wiper to retrack along the path indicated by the composite dash line 25, 24, 23.

In Fig. 4 I have illustrated a different source of power which, for the purposes of illustration, is shown as the vane type of suction operated motor 26, the same being of the type illustrated in Patent No. 1,562,122 granted to John R. Oishei, November 17, 1925. On the piston or vane shaft 27 is fixed a gear 28 for meshing with and driving a gear 16′ which is fixed on a shaft of the drive sprocket 2′. The reversing valve, generally indicated at 29, is designed for being operated by parts similar to the actuating parts 21 and 22 of the disclosure made in Fig. 1, one such part or trip 22′ being depicted in Figs. 4 and 5. Consequently, the sprocket chain 4′ will have back and forth movement imparted thereto in a manner similar to that of Fig. 1.

The switch 20 and the reversing valve 29 may be of a desired construction, and for the purposes of illustration I have shown in Fig. 6 one form of snap mechanism which will readily adapt itself for use either in the switch 20 of Fig. 1 or in the valve 29 of Fig. 4.

Referring more in detail to Fig. 6 there is shown a power switching member 20 operating between two operative positions for bridging two of three ports or two of three contacts, as the case may be, and generally indicated at 31. An actuating arm 32 is movable relative to the power switching member 30 and has a spring 33 connecting the outer end to an anchor 34. The members 30 and 32 are herein shown as being pivoted on the same axis and the member 30 is provided with spaced ears 35 between which the lever 32 has limited independent movement. The action would, therefore, be substantially as follows:—The outer end 36 of the lever 32 is engaged alternately by the trips 21 and 22 as the wiper approaches its opposite limits of movement, thereby swinging the lever 32 independent of the member 30 until the spring 33 moves across the pivotal axis of said lever, or across dead center, at approximately which time said lever engages the forward ear 35 and under the influence of the spring swings the power switching member 30 to its new position as defined by the respective stops 37.

From the foregoing it will be observed that the effective cleaning of the wiper will be considerably enlarged; that by reason of the terminating swings of the wiper the same will be given an accelerated movement for widening the field of vision. Therefore, the straight reciprocatory movements may be comparatively short and the cleared area quickly widened by the terminal arcuate movements of the wiper. The sprockets, which term is used herein to include wheels, pulleys, rollers and the like, are resiliently separated so as to hold the chain against loose play and also to insure of the wiper travelling a straight path between sprockets.

The chain, having a straight portion terminating in curved end portions, constitutes a guide means for the wiper element, defining a path of movement of the wiper which may be substantially straight in the medial phases of movement and curved at the initial and terminal phases of movement.

What is claimed is:

1. A windshield cleaner comprising a support, spaced sprockets thereon, a chain passing over and engaging said sprockets, a wiper carriage incorporated in the chain make-up and movable about the sprockets, a wiper moving arm on the carriage, a drive for the chain, a reversing mechanism for the drive to reciprocate the wiper, and a pair of trips spaced along the chain for alternately actuating the reversing mechanism after the wiper carriage has begun its travel about the respective sprockets whereby the wiper will traverse a straight path terminating in arcs.

2. A windshield cleaner comprising a support, spaced wheels journalled thereon, a flexible endless member supported by said wheels, a carriage on said member having a wiper arm bearing extending substantially parallel to said member, said bearing having a movement between said wheels and about and in a path concentric with the axis of said wheels, a wiper arm engaged in the bearing, spaced trips on the member, a drive for said member, and reversing means arranged in the path of said trips and alternately operable thereby to reverse the drive.

3. In a windshield cleaner, a wiper element, flexible oscillating means for carrying affixed thereto said wiper element, the portion of said reciprocating means to which the wiper element is affixed reciprocating in a path having a substantially straight portion terminating in curved portions, whereby the wiper is guided in a straight path during medial phases of its movement and in a curved path during the initial and terminal phases of its movement.

4. A windshield cleaner comprising a support, a drive mounted thereon, a sprocket journalled on the support and driven from said drive, said support having a part yieldably and extensibly connected thereto, a second sprocket journalled in said part, a chain taking over said sprockets, a wiper carriage constituting a link of said chain and wholly supported thereby for reciprocatory movement, a wiper carried by said carriage for movement therewith, and means for reversing the movement of the chain.

5. A windshield cleaner comprising a support, a drive mounted thereon, a sprocket journalled on the support and driven from said drive, a second sprocket mounted on the support, a chain taking over said sprockets, resilient means acting to separate the sprockets, a wiper, and a wiper carriage wholly supported by the chain for movement therewith, said resilient means acting to maintain the chain taut and thereby define a straight course for the wiper carriage between sprockets.

6. A windshield cleaner comprising a support, a pair of sprockets thereon, a chain extending over and engaging the sprockets, means for supporting the chain substantially straight between sprockets, means on the chain for carrying a wiper, said wiper extending substantially normal to the portion of the chain to which it is attached, said means being movable by said chain a distance about the periphery of each sprocket and between sprockets as a path of movement, and means for limiting such movement of said wiper carrying means.

7. A windshield cleaner comprising a support, a pair of sprockets thereon, a chain passing over and engaging the sprockets, means for supporting the chain substantially straight between sprockets, means carried by the chain for carrying a wiper, said carrying means movable by said chain part way about each sprocket and between sprockets as a path of movement, a drive for the chain, and reversing means operable by and during movement of the chain for limiting the path of movement of said wiper carrying means.

HENRY HUEBER.